(12) United States Patent
Veis

(10) Patent No.: US 9,630,428 B2
(45) Date of Patent: Apr. 25, 2017

(54) PRINT UNIT ACTIVATION BY MEANS OF A CLOCK UNIT

(71) Applicant: Hewlett-Packard Industrial Printing LTD, Netanya (IL)

(72) Inventor: Alex Veis, Kadima (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 15/133,271

(22) Filed: Apr. 20, 2016

(65) Prior Publication Data

US 2016/0318314 A1  Nov. 3, 2016

(30) Foreign Application Priority Data

Apr. 28, 2015   (EP) .................................... 15165350

(51) Int. Cl.
| | |
|---|---|
| *B41J 29/393* | (2006.01) |
| *B41J 13/00* | (2006.01) |
| *B41J 3/407* | (2006.01) |
| *B41J 11/00* | (2006.01) |
| *B41J 11/06* | (2006.01) |
| *B41J 11/42* | (2006.01) |
| *G06K 15/02* | (2006.01) |
| *G06K 15/10* | (2006.01) |
| *G06K 15/16* | (2006.01) |

(52) U.S. Cl.
CPC ........... *B41J 13/0009* (2013.01); *B41J 3/407* (2013.01); *B41J 11/007* (2013.01); *B41J 11/0095* (2013.01); *B41J 11/06* (2013.01); *B41J 11/42* (2013.01); *G06K 15/021* (2013.01); *G06K 15/102* (2013.01); *G06K 15/16* (2013.01)

(58) Field of Classification Search
CPC ........ B41J 13/0009; B41J 3/407; B41J 11/42; B41J 11/007; B41J 11/0095; B41J 11/06; G06K 15/021; G06K 15/102; G06K 15/16

See application file for complete search history.

(56) References Cited

U.S. PATENT DOCUMENTS

| 5,097,273 | A | * | 3/1992 | Moro ....................... B65H 7/02 271/258.01 |
|---|---|---|---|---|
| 8,388,085 | B2 | | 3/2013 | Linn |
| 8,474,937 | B2 | | 7/2013 | Jeong et al. |
| 8,777,359 | B1 | | 7/2014 | Mealy |

(Continued)

FOREIGN PATENT DOCUMENTS

JP   2007069555   3/2007

OTHER PUBLICATIONS

Dimatix—"Modular Fire Pulse Generator"—www.dimatix.com, Apr. 1, 2010—2 pages.

(Continued)

*Primary Examiner* — Julian Huffman
(74) *Attorney, Agent, or Firm* — HP Inc. Patent Department

(57) ABSTRACT

A printing method comprises advancing a media to be printed towards a printing unit of a printing device by means of a media advance unit, detecting a position of the media relative to the printing unit, and providing a corresponding position sensor signal, and activating the printing unit to print on a predetermined portion of the media in accordance with the position sensor signal and a timing signal provided by a clock unit.

17 Claims, 3 Drawing Sheets

(56) References Cited

U.S. PATENT DOCUMENTS

| | | | |
|---|---|---|---|
| 2001/0012131 A1 | 8/2001 | Melzer et al. | |
| 2005/0200635 A1* | 9/2005 | Silverbrook | B41J 2/01 347/2 |
| 2007/0263021 A1* | 11/2007 | Tanaka | B41J 3/28 347/12 |
| 2008/0079761 A1* | 4/2008 | Furuya | B41J 2/04505 347/13 |
| 2013/0088554 A1 | 4/2013 | Veis | |
| 2013/0170928 A1* | 7/2013 | Veis | B41J 11/06 414/222.01 |
| 2013/0257949 A1 | 10/2013 | Qiu et al. | |
| 2014/0092155 A1 | 4/2014 | Suzuki | |

OTHER PUBLICATIONS

EP Search Report—Application No. 15165350.8-1701 dated Aug. 13, 2015—7 pages.

\* cited by examiner

PRINT UNIT ACTIVATION BY MEANS OF A CLOCK UNIT

BACKGROUND

The disclosure relates to a method and system for activating a printing unit of a printer, in particular for printers with moving pallets.

Some large-scale printers, in particular inkjet primers, are capable of printing on bulky and cumbersome printing media, such as corrugated boards, cardboards, or other large rigid or semi-rigid print substrates. In some of these printers, the printing media is moved on pallets from the media loading zone past the printheads towards the media unloading zone. The pallets that support the media may circulate on an endless track.

DETAILED DESCRIPTION

Figure 1:
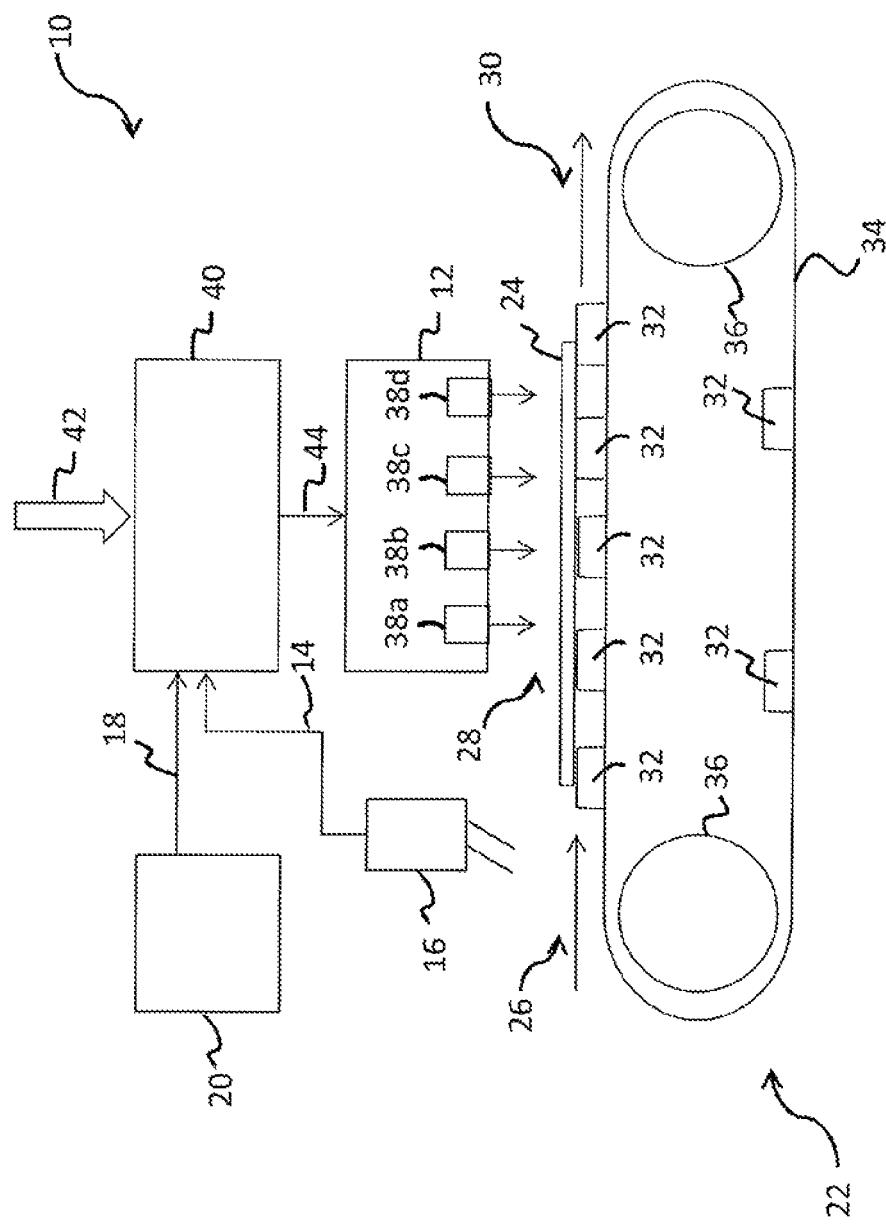
FIG. 1 is a schematic illustration of an example of a printing device.

A printing method according to the present disclosure comprises advancing a media to be printed towards a printing unit of a printing device by means of a media advance unit, detecting a position of said media relative to said printing unit, and providing a corresponding position sensor signal, and activating said printing unit to print on a predetermined portion of said media in accordance with said position sensor signal and a timing signal provided by a clock unit.

Activating the printing unit based on said position sensor signal and said timing signal provided by said clock unit may allow an accurate synchronization of the firing of the printheads of the printing unit with the media position, without the need to rely on feedback from the media advance unit.

The position sensor signal may provide index information corresponding to a starting position or leading edge of the media or a printing area on said media or a line to be printed on said media. Based on said position sensor signal and based on a known or predetermined velocity at which said media advance unit advances said media to be printed, towards said printing unit, the printing unit may be activated in accordance with a timing signal provided by the clock unit. In these examples, neither feedback nor additional position information from the media advance unit is used for activating said printing unit.

The method may hence facilitate the synchronization of the printhead activation with the media movement, and may contribute to a more accurate printing and less complex printing devices.

A printing unit, in the sense of the present disclosure, may denote any unit adapted to apply printed marks at selected positions on said media to be printed. In particular, said printing unit may comprise at least one printhead, such as an inkjet printhead.

In an example, said printing unit may comprise a plurality of printheads corresponding to printing liquid of different colors, in particular ink of different colors.

A media, in the sense of the present disclosure, may denote any substrate on which printed marks may be applied, including paper, cardboard, corrugated board, or any other material suitable for printing.

Said timing signal may be an open-loop timing signal.

In the sense of the present disclosure, a clock unit with an open-loop timing signal (as opposed to a closed-loop signal) may be understood to denote a clock unit that is not based on feedback to determine if its output has achieved the desired goal, but merely uses the current state and an underlying model of the system.

In particular, said timing signal may be independent of feedback from said media advance unit.

In other words, said timing signal may be uncoupled to or independent of a current position of said media in said printing device.

Activating said printing unit, in the sense of the present disclosure, may comprise triggering said printing unit.

Triggering said printing unit, in an example, may comprise triggering a printhead of said printing unit to emit printing liquid towards said media to be printed.

Said printing unit may be activated in accordance with a speed at which said media advance unit advances said media towards said printing unit.

Said speed may be a pre-determined speed. Alternatively, said speed may be a measured speed. The speed may be measured in a one-time measurement, and without providing constant feedback. In particular, said speed may be measured with a measurement sensor independent of and/or uncoupled from said media advance unit.

In an example, said method comprises activating said printing unit to print on said predetermined, position of said media in accordance with merely said position sensor signal and said timing signal provided by said clock unit and said speed at which said media advance unit, advances said media towards said printing unit.

Said detected position of said media relative to said printing unit may be an index, such as an edge of said media or the onset of a media printing area or line.

In an example, the method further comprises resetting a data pipeline stream for printing on said media in accordance with said position sensor signal.

Said data pipeline stream may provide or represent the data to be printed on said media.

Resetting said data pipeline stream in accordance with said position sensor signal may prevent the system from integrating timing errors that could otherwise be generated in an open-loop time-controlled system.

In an example, said media is advanced towards said printhead on a plurality of pallets which trove on a track.

In particular, said track may be an endless track on which said pallets circulate.

A media advance unit based on moving pallets advances the media with high spatial accuracy, and hence the firing, of the printhead may be based on an external clock signal without requiring closed-loop feedback that incorporates a detected current media position.

However, the disclosure is not so limited, and one skilled in the art will appreciate that; the techniques described in the present disclosure may be applied generally to printing devices of a variety of types, including inkjet and laser printers of various sizes and for various different purposes.

The disclosure further relates to a printing device, comprising a printing unit to print on a media, a media advance unit that advances said media to be printed towards said printing unit, a sensor unit that detects a position of said media relative to said printing unit, and provides a corresponding position sensor signal, and a clock unit that provides a timing signal. Said printing device activates said printing unit to print on it predetermined portion of said media in accordance with said position sensor signal and said timing signal.

In an example, said clock unit is a free-running clock unit.

A free-running clock unit, in the sense of the present disclosure, may denote a clock unit that provides a timing signal without relying on feedback.

In particular, said clock, unit may be physically uncoupled and/or data-uncoupled from said media advance unit.

In an example, said clock unit comprises an oscillating crystal. Oscillating crystals are known to provide timing signals with high accuracy in the range of 10 microseconds or better. The timing accuracy of the clock unit directly transfers into a correspondingly high spatial accuracy with which said printing unit may print on said media.

Said media advance unit may comprise a plurality of pallets for supporting said media to be printed.

In particular, said pallets may be movable pallets.

In an example, said media advance unit comprises a track on which said pallets move.

In particular, said track may be an endless track on which said pallets circulate.

Said media advance unit may comprise at east one linear motor for moving said pallets, in particular along said track.

Said media advance unit may comprise a plurality of static magnetic elements and a plurality of coils coupled to said pallets.

The disclosure further relates to a computer program or a computer program product comprising computer-readable instructions which, when read on a computing device, in particular a computing device connected to or incorporated into a printing device with some or all of the features described above, implement a method with some or all of the features described above.

A printing method and printing device in which a printing unit is activated by means of an external clock unit will now be described in greater detail with reference to FIGS. 1, 2, and 3 for the specific example of a large-scale printer with movable pallets. However, the present disclosure is not so limited, and applies more generally to a variety of printing methods and printing devices with different media advance mechanisms.

FIG. 1 is a schematic illustration of a printing device 10 in which a printing unit 12 is triggered to print in accordance with a position sensor signal 14 provided by a sensor unit 16 and a timing signal 18 provided by a clock unit 20. The printing device 10 comprises a media advance unit 22 in which a printing media 24, such as a corrugated board, cardboard, or other large rigid or semi-rigid print substrate is moved from a loading zone 26 past a printing zone 28 that is defined by the location of the printing unit 12 to an unloading zone 30.

As sketched in FIG. 1, the media advance unit 22 comprises a plurality of pallets 32 that support the printing media 24. The pallets 32 are movable along a circular track 34 between the loading zone 26 and the unloading zone 30. For instance, each of the pallets 32 may be bar-shaped, and may be provided with electromagnetic coils at respective end portions (not shown). A sinusoidal voltage commutation signal that may be generated by a control unit 40 may be supplied to the electromagnetic coils via brushes from the (static) circular track 34. The circular track 34 may further be provided with static magnets (not shown), which, together with the coils, establish a linear motor that may be employed to drive the pallets 32 individually along the circular track 34.

The circular track 34 may comprise guide rails (not shown) in which the pallets 32 may move.

Wheel elevators 36 may be employed to transfer the pallets 32 between an upper forward path and a lower return path, as schematically illustrated in FIG. 1.

Alternatively, the pallets may be moving continuously on the endless rail throughout the forward path and the return path. The linear motors may be moved on curved rails by using sophisticated commutation waveforms.

Each of the pallets 32 may be provided with a plurality of suction holes or recesses (not shown) through which a vacuum source (not shown) may apply a vacuum force to the underside of the printing media 24, thereby removably securing the printing media 24 to the pallets 32 for transport through the printing zone 28.

Heavy-duty printing devices with moving pallets 32 and transport mechanisms are described in greater detail in United States patent applications US 2013/0088554 A1 and US 2013/0170928 A1, to which reference is made.

The printing unit 12 serves for printing print marks on the printing media 24 at predetermined positions. In the configuration illustrated in FIG. 1, the printing unit 12 comprises a plurality of ink printheads 38a to 38d. For instance, the printheads 38a to 38b may correspond to the four basic colors cyan, magenta, yellow, and black. However, this is just one example, and any number of printheads may be employed in the context of the present disclosure.

As the printing media 24 is inserted into the media advance unit 22 at the loading zone 26, the sensor unit 16 detects a position of the printing media 24. For instance, the sensor unit 16 may comprise a capacitive sensor that detects a leading edge of the printing media 24. Alternatively or additionally, the sensor unit 16 may comprise, an optical sensor that detects a leading edge of the printing media 24, or the onset of a portion of the printing media 24 on which the printing unit 12 shall print. Information relating to the geometry of the printing media 24, its lending or trailing edges or the location of a portion of said printing media 24 on which to be printed is sometimes denoted "index information" in the art. Hence, in other words the sensor unit 16 may detect index information relating to the printing media 24.

The sensor unit 16 sends the position sensor signal 14 relating to the index information to the control unit 40. The control unit 40 further receives a data stream 42 of information to be printed on the printing media 24, such as from an external computing device (not shown).

In general, several mechanisms for moving the pallets are known. A first implementation uses electric motors with static coils attached to the track and moving magnets attached to the pallets. These systems are simple to use, and can simultaneously control many pallets with high accuracy. However, they need to be custom-made and are costly. Alternatively, linear motors with static magnets mounted to the track and moving coils mounted to the pallets may be employed to drive the pallets, as described above. In the latter systems, an encoder head may be provided on each side of the moving pallet, and the encoder signals used to synchronize the printhead fire pulse to the movement of the media. However, the number of encoders in a given printing device may be considerable, and hence many corresponding encoder signals exist. Depending on the position of the pallets, each time another signal needs to be used for data pipeline synchronization. The encoder signals from the moving encoders can be sinusoidal signals or high frequency digital signals. Both types of signals are easily disturbed when they are picked up from the moving encoders, such as through sliding brushes.

In a known printing device such as described in US 2013/0088554 A1 or US 201310170928 A1, the fire timing of the inkjet printheads 38a to 38d is synchronized with the media movement by means of rotary encoders coupled to the pellets.

In contrast, the printing device 10 illustrated in FIG. 1 comprises a clock unit 20, such as a clock unit comprising an oscillating crystal that may provide a timing signal 18 to the control unit 40 with high precision in the microsecond range.

Based on the index position sensor signal 14, the timing signal 18, and the known velocity at which the pellets 32 (and hence the printing media 24) move in the media advance unit 22, the control unit 40 may determine the precise timing at which the portions of the printing media 24 on which the data stream 42 shall be printed reach the respective printheads 38a to 38d, and may provide the respective print trigger signals 44 to the printing, unit 12. Hence, the information pertaining to the data stream 42 may be printed at the pre-defined positions of the printing media 24 with high timing accuracy, and hence high spatial accuracy.

As can be taken from FIG. 1, the clock unit 20 may be an external clock unit that provides an open-loop timing signal unrelated, to the media advance movement in the media advance unit 22, and in particular unrelated to or independent of position feedback from the pellets 32. The position sensor signal 14 provided by the sensor unit 16 may merely serve as a media entry sensor to trigger the clock unit 20, but need not provide constant or repeated information on the position of the printing media 24 as the printing media 24 advances towards and through the printing zone 28. In particular, the position sensor signal 14 may be unrelated to the current positions of the pellets 32.

The control unit 40 may employ the position sensor signal 14 as a reset signal to reset the data pipeline clocking of the data stream 42, thereby preventing the system from integrating timing errors that could otherwise accumulate in the open loop control, and hence further enhancing the printing accuracy.

The clock unit 20 is shown in FIG. 1 as an external unit. However, this is merely an example, and in some implementations the clock unit 20 may be incorporated into the control unit 40.

In some examples, the media advance unit 22 comprises a clock unit for controlling the media advance movement, in particular the movement of the pellets 32. In these configurations, the same clock unit may provide the timing signal 18 for the control unit 40 and for the media advance movement.

Figure 2:
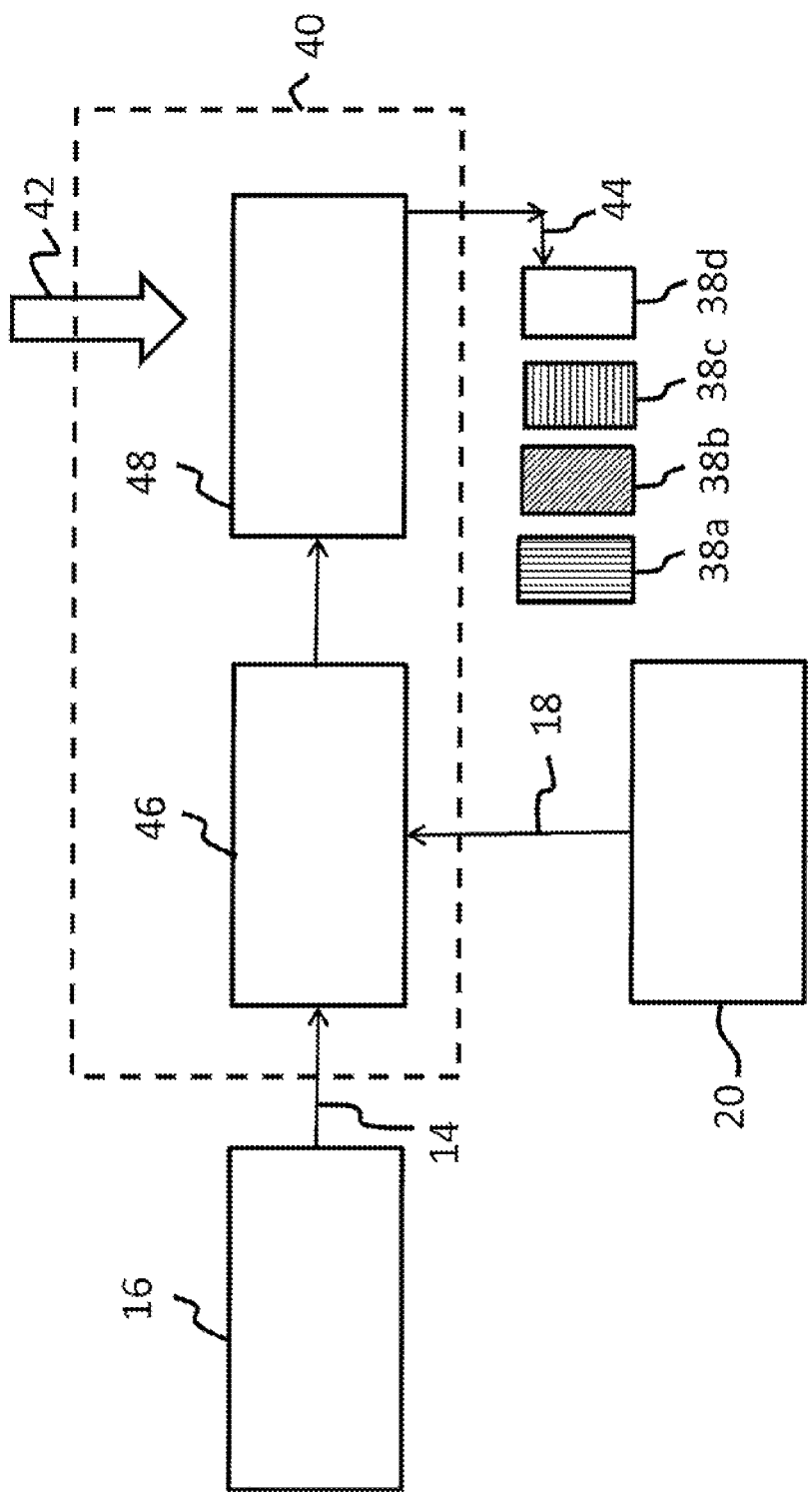
FIG. 2 is a block diagram illustrating components for activating a printing unit of a printing device in accordance with a position sensor signal and a timing signal provided by a clock unit in accordance with an example.

FIG. 2 is a schematic view of some of the components of a printing device according to an example of the present disclosure, and in particular illustrates an example for the data handling in the control unit 40.

As described above in more detail with reference to FIG. 1, the sensor unit 16 provides a position sensor signal 14 corresponding to index information of the printing media 24. The external clock unit 20 provides the timing signal 18. The control unit 40 comprises a clock generator unit 46 that receives the timing signal 18 from the external clock unit 20 and is triggered or reset by the position sensor signal 14 received from the sensor unit 16, thereby synchronizing the control unit 40 to the index information of the printing media 24 inserted into the loading zone 26.

The control unit 40 further comprises a data processing unit 48 which receives the clock and index information from the clock generator unit 46, and further receives the data stream 42 containing the information to be printed, and based on this input generates the print trigger signals 44 for the printheads 38a to 38d.

Figure 3:
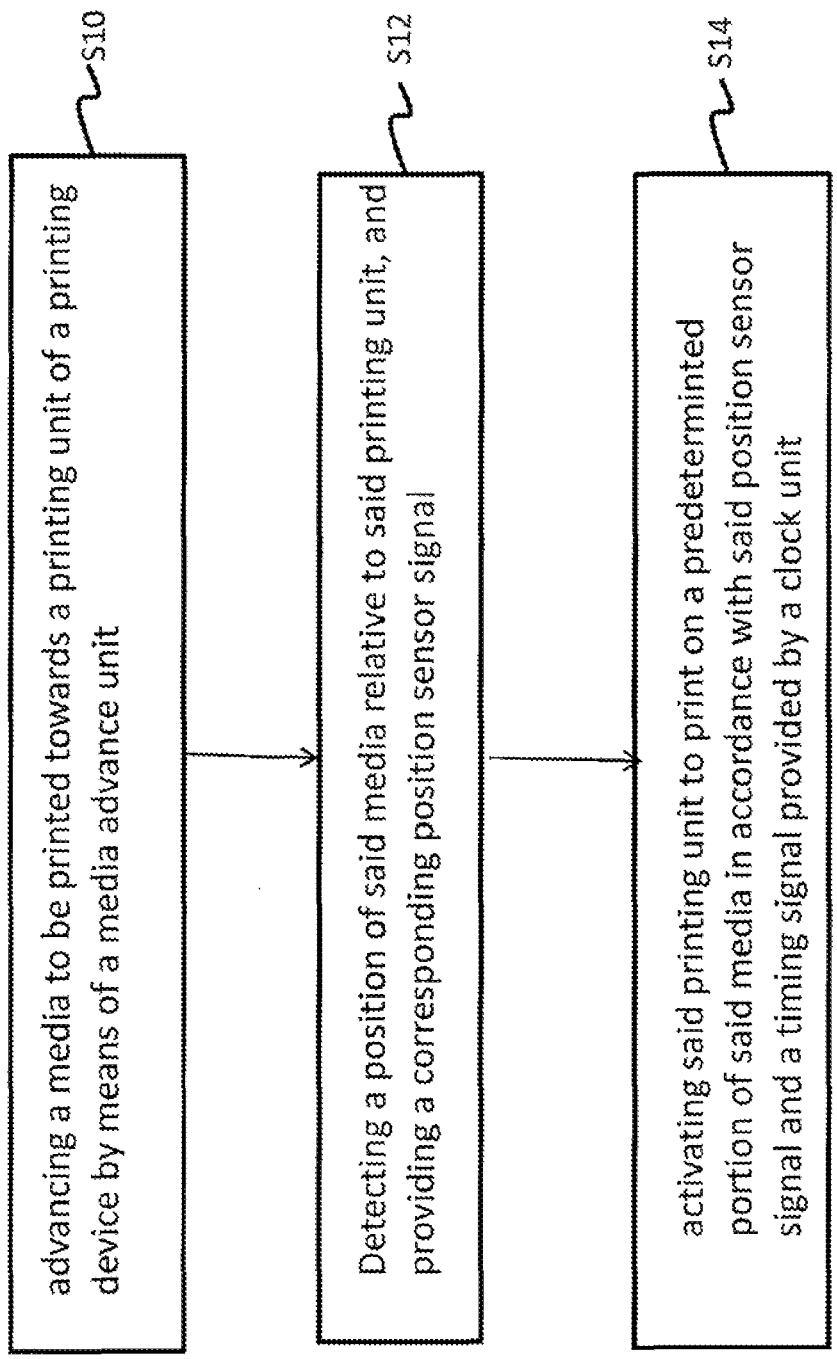
FIG. 3 is a flow diagram that illustrates a printing method in which a printing unit is activated in accordance with a position sensor signal and a timing signal provided by a clock unit in accordance with an example.

FIG. 3 is a flow diagram for illustrating a method according to an example of the present disclosure, such as for printing with the printing devices illustrated in FIG. 1 or 2.

In S10, the printing media 24 to be printed is advanced towards the printing unit 12 of the printing device 10 by means of the media advance unit 22.

In S12, a position of said printing media 24 relative to said printing unit 12 is detected, and a corresponding position sensor signal 14 is provided, such as to a control unit 40.

S10 and S12 may be executed concurrently, or sequentially.

In S14, said printing unit 12 is activated, to print on a predetermined portion of said printing media 24 in accordance with said position sensor signal 14 and a timing signal 18 provided by a clock unit 20.

The open loop timing approach of the present disclosure may greatly simplify the system structure of the printing device, and may enable printing systems with high precision based on relatively low cost static magnets and moving coils linear motors.

The description of the examples and the figures merely serve to illustrate the disclosure, but should not be understood to imply any limitation. The scope of the disclosure is to be determined based on the appended claims.

REFERENCE SIGNS 10 printing device
12 printing unit
14 position sensor signal
16 sensor unit
18 timing signal
20 clock unit
22 media advance unit
24 printing media
26 loading zone
28 printing zone
30 unloading zone
32 pallets
34 circular track
36 wheel elevators
38a-38d printheads of printing unit 12
40 control unit
42 data stream
44 print trigger signals
46 clock generator unit
48 data processing unit

The invention claimed is:
1. A printing method, comprising:
advancing, using a media advance unit, a media to be printed towards a printing unit of a printing device;
detecting a position of the media relative to the printing unit, and providing a corresponding position sensor signal;
activating, by a controller, the printing unit to print on a portion of the media, a timing of the activating being according to the position sensor signal and a timing signal provided by a clock unit; and resetting the controller in response to the position sensor signal.

2. The method of claim 1, wherein the timing signal is an open-loop timing signal.

3. The method of claim 1, wherein the timing signal is independent of feedback from the media advance unit.

4. The method of claim 1, wherein the timing of the activating of the printing unit is further in accordance with a speed at which the media advance unit advances the media towards the printing unit.

5. The method of claim 1, further comprising:
resetting a data pipeline stream for printing on the media in accordance with the position sensor signal.

6. The method of claim 1, wherein the media is advanced towards the printing unit on a plurality of pallets which move on a track.

7. The method of claim 6, wherein the track is an endless track.

8. The method of claim 1, wherein the detecting of the position of the media uses a sensor that outputs the position sensor signal.

9. The method of claim 1, wherein the activating comprises activating a printhead of the printing unit that is synchronized with a position of the media, without receiving feedback from the media advance unit.

10. A printing device, comprising:
a printing unit comprising a printhead to print on a media;
a moveable support to advance the media towards the printing unit;
a sensor to detect a position of the media relative to the printing unit, and to provide a corresponding position sensor signal;
a clock to provide a timing signal, wherein the clock is a free-running clock; and
a controller to activate the printhead to print on a portion of the media, a timing of the activating being according to the position sensor signal and the timing signal.

11. The printing device of claim 10, wherein the clock is uncoupled from a media advance unit comprising the moveable support.

12. The printing device of claim 10, wherein the clock comprises an oscillating crystal.

13. The printing device of claim 10, wherein the moveable support comprises a plurality of pallets for supporting the media to be printed.

14. The printing device of claim 13, further comprising a track on which the pallets move.

15. The printing device of claim 13, further comprising a linear motor to move the pallets.

16. The printing device of claim 13, further comprising a plurality of static magnetic elements and a plurality of coils coupled to the pallets.

17. A non-transitory computer-readable medium storing instructions which, when executed cause a computing device to:
detect, based on a position sensor signal from a sensor, a position of a media relative to a printing unit, the media advanced by a media advance unit; and
activate the printing unit to print on a portion of the media, a timing of the activating being according to the position sensor signal and a timing signal provided by a clock unit, wherein the activating comprises activating a printhead of the printing unit that is synchronized with a position of the media, without receiving feedback from the media advance unit.

* * * * *